United States Patent
Gautron et al.

(10) Patent No.: US 9,449,428 B2
(45) Date of Patent: Sep. 20, 2016

(54) METHOD FOR GENERATING AN ENVIRONMENT MAP

(75) Inventors: Pascal Gautron, Cesson Sevigne (FR); Jean-Eudes Marvie, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 258 days.

(21) Appl. No.: 13/517,440

(22) PCT Filed: Dec. 20, 2010

(86) PCT No.: PCT/EP2010/070247
§ 371 (c)(1),
(2), (4) Date: Jun. 20, 2012

(87) PCT Pub. No.: WO2011/080142
PCT Pub. Date: Jul. 7, 2011

(65) Prior Publication Data
US 2012/0256923 A1    Oct. 11, 2012

(30) Foreign Application Priority Data
Dec. 21, 2009    (EP) .................................... 09306301

(51) Int. Cl.
*G06T 15/50*    (2011.01)
(52) U.S. Cl.
CPC .................................... *G06T 15/50* (2013.01)
(58) Field of Classification Search
USPC ........................................................ 345/426
See application file for complete search history.

(56) References Cited

U.S. PATENT DOCUMENTS

| | | | |
|---|---|---|---|
| 4,335,426 A | 6/1982 | Maxwell et al. |
| 4,680,753 A | 7/1987 | Fulton et al. |
| 5,809,313 A | 9/1998 | Gianni |
| 5,862,452 A | 1/1999 | Cudak et al. |
| 5,958,057 A | 9/1999 | Gianni |
| 6,058,106 A | 5/2000 | Cudak et al. |
| 6,069,896 A | 5/2000 | Borgstahl et al. |
| 6,144,992 A | 11/2000 | Turpin et al. |

(Continued)

FOREIGN PATENT DOCUMENTS

| | | |
|---|---|---|
| CN | 1291848 | 4/2001 |
| CN | 101366284 A | 2/2009 |

(Continued)

OTHER PUBLICATIONS

Armstrong, J. Scott, Long-Range Forecasting: From Crystal Ball to Computer (John Wiley & Sons, Inc., 1978).*

(Continued)

*Primary Examiner* — Barry Drennan
*Assistant Examiner* — Richard M Russell
(74) *Attorney, Agent, or Firm* — Tutunjian & Bitetto, P.C.

(57) ABSTRACT

An environment map representative of lighting information of a real environment. As to enhance the impression of immersion into a virtual environment, the method comprises the steps of acquisition at real time of an image representative of a partial lighting information of said real environment from a digital optical acquisition device, said image comprising a plurality of pixels; and estimation of said environment map by extrapolation of at least a part of said pixels of said image, the extrapolation comprising the application of a first value corresponding to the mean value of the pixels of said image to at least a first part of the environment map.

13 Claims, 6 Drawing Sheets

(56) References Cited

U.S. PATENT DOCUMENTS

| | | | |
|---|---|---|---|
| 6,154,743 | A | 11/2000 | Leung et al. |
| 7,852,376 | B2 * | 12/2010 | Chen et al. ................ 348/218.1 |
| 8,391,634 | B1 * | 3/2013 | Kwatra et al. ................ 382/274 |
| 2005/0068330 | A1 * | 3/2005 | Speigle ................ H04N 1/6086 345/589 |
| 2007/0038944 | A1 * | 2/2007 | Carignano .............. G06T 15/20 715/757 |
| 2008/0024523 | A1 * | 1/2008 | Tomite et al. ................ 345/632 |
| 2009/0109240 | A1 * | 4/2009 | Englert et al. ................ 345/633 |
| 2009/0167762 | A1 * | 7/2009 | Alon ............................ 345/426 |
| 2009/0251460 | A1 * | 10/2009 | Dunnigan .................... 345/419 |
| 2010/0134516 | A1 | 6/2010 | Cooper |

FOREIGN PATENT DOCUMENTS

| | | |
|---|---|---|
| CN | 101710429 | 10/2009 |
| CN | 100594519 | 3/2010 |
| CN | 101751654 | 6/2010 |
| DE | 4340679 | 6/1995 |
| EP | 35789 | 9/1981 |
| EP | 0078389 | 5/1983 |
| EP | 0200365 | 12/1986 |
| EP | 1065888 | 12/2001 |
| EP | 2424244 | 2/2012 |
| JP | H08063618 | 3/1996 |
| JP | 2000235657 | 8/2000 |
| JP | 2003187267 | 7/2003 |
| JP | 2005260583 | 9/2005 |
| JP | 2007018173 A | 1/2007 |
| JP | 2008079897 | 4/2008 |
| WO | WO9312595 | 6/1993 |

OTHER PUBLICATIONS

Noor, Humera, and Shahid Hafeez Mirza. "Virtual Image Generation by View Extrapolation of Real Scenes." Mehran University Research Journal of Engineering and Technology (2008): 347-364.*

Cameron: "Hallucinating Environment Maps From Eagle Images" Dec. 19, 2005 pp. 1-9.

Kahn et al; "Image-Based Material Editing" ACM Transactions on Graphics ACM USA, vol. 25, N° Jul. 3, 2006, pp. 654-663.

Wittehdri Tips and Tricks and FAQ Siggraph Asia 2009 Oct. 4, 2009, pp. 1-65.

Mitchell__Adding a Diffuse Glow to Your Images 2004, pp. 1-13.

Lalonde__et al__Synthesizing Environment Maps From a Single Image Technical report CMU-RI-TR-10-24, Jul. 2010, pp. 1-17 Carnegie Mzllon University, Pittsburg, USA.

Search Report Dated May 20, 2011.

Heidrich et al., "Realistic, Hardware-accelerated Shading and Lighting", Proceedings of the 26th Annual Conference on Computer Graphics and Interactive Techniques, Los Angeles, California, USA, Aug. 8, 1999, pp. 171-178.

Ramamoorthi et al., "Frequency Space Environment Map Rendering", Proceedings of the 29th Annual Conference on Computer Graphics and Interactive Techniques, San Antonio, Texas, USA, Jul. 23, 2002, pp. 517-526.

Sloan et al., "Precomputed Radiance Transfer for Real-Time Rendering in Dynamic, Low-Frequency Lighting Environments", Proceedings of the 29th Annual Conference on Computer Graphics and Interactive Techniques, San Antonio, Texas, USA, Jul. 23, 2002, pp. 527-536.

Colbert et al., "Real-time Shading with Filtered Importance Sampling", Proceedings of Eurographics Symposium on Rendering, Sarajevo, Bosnia and Herzegovina, Jun. 23, 2008, pp. 1.

Debevec et al., "Recovering High Dynamic Range Radiance Maps from Photographs", Proceedings of the 24th Annual Conference on Computer Graphics and Interactive Techniques, Los Angeles, California, USA, Aug. 3, 1997, pp. 369-378.

Stumpfel et al., "Direct HDR Capture of the Sun and Sky", Proceedings of the 33rd Annual Conference on Computer Graphics and Interactive Techniques, Boston, Massachusetts, USA, Jul. 29, 2006, pp. 1-5.

Havran et al., "Interactive System for Dynamic Scene Lighting using Captured Video Environment Maps", Eurographics Symposium on Rendering, Konstanz, Germany, Jun. 29, 2005, pp. 31-42.

Mannami et al., "Adaptive dynamic range camera with reflective liquid Crystal", Journal of Visual Communication and Image Representation, vol. 18, Jun. 2007, pp. 359-365.

Cohen et al., "LightGen Plugin", http://gl.ict.usc.edu/HDRShop/lightgen/2001, Jan. 2001, pp. 1-3.

Kang et al., "High Dynamic Range Video", Proceedings of the 30th Annual Conference on Computer Graphics and Interactive Techniques, San Diego, California, USA, Jul. 27, 2003, pp. 319-325.

Bennett et al., "Video Enhancement Using Per-Pixel Virtual Exposures", Proceedings of the 32nd Annual Conference on Computer Graphics and Interactive Techniques, Los Angeles, California, USA, Jul. 31, 2005, pp. 845-852.

Kurachi, N., "Hot Stuff! Movie", CG World, vol. 137, Dec. 1, 2009, pp. 58-63.

Nishina et al., "Lighting environment estimation by adaptive high dynamic range image generation for augmented reality", IPSJ SIG Technical Report, vol. 2008, No. 3, Jan. 17, 2008, pp. 185-190. English Abstract.

Kanbara et al., "Augmented Reality in Consideration of a Light Source Environment in the Real World, Solution for Geometrical and Optical Consistency in Vision-based Augmented Reality," Image Lab, vol. 14, No. 10, Oct. 1, 2003, pp. 43-47.

Kakimoto et al., "A Real-Time Glare Rendering Technique Taking into Account Surface Reflection Attributes", The Journal of the Institute of Image Electronics Engineers of Japan, vol. 32, No. 4, Jul. 25, 2003, pp. 336-345. English Abstract.

Mitsumine et al., "A method of modification of lighting condition for Image-based virtual studios", ITE Technical Report, vol. 26, No. 57, Sep. 6, 2002, pp. 5-8. English Abstract.

Yeoh et al., "Consistent real-time lighting for virtual objects in augmented reality", 2009 8th IEEE International Symposium on Mixed and Augmented Reality Science and Technology, Orlando, Florida, USA, Oct. 19, 2009, pp. 223-224.

Yoo et al., "Real time light source estimation using a fish-eye lens with ND filters", 2008 International Symposium on Ubiquitous Virtual Reality, Gwangju, Korea, Jul. 10, 2008, pp. 41-42.

Metz et al., "Challenges of merging digital imaging and wireless communication", Proceedings of 13th International Conference on VLSI Design, Calcutta, India, Jan. 3, 2000, pp. 122-127.

Shiose et al., "Multiagent model of VICS", 1999 IEEE International Conference on Systems, Man, and Cybernetics, Tokyo, Japan, Oct. 12, 1999, vol. 4, pp. 574-579.

Casey, L., "Lessons from Norstar's distributed call processing system", Operating Systems Review, vol. 25, No. 2, Apr. 1991, pp. 108-111.

Tan et al., "Illumination method in augmented reality based on dynamic light map", Computer Engineering, vol. 35, No. 21, Nov. 2009, pp. 261-263. English Abstract.

Mathy et al., "QoS negotiation for multicast communications", International COST 237 Workshop on Multimedia Transport and Teleservices, Vienna, Austria, Nov. 13, 1994, pp. 199-218.

Rapp, L., "The 'napsterization' of the European content industry—a scenario for 2005", Journal of Policy, Regulation and Strategy for Telecommunications information and Media, vol. 2, No. 6, Dec. 2000, pp. 551-572.

Edwards et al., "An analysis of a course-oriented electronic mailing list", Computer Science Education, vol. 9, No. 1, 1999, pp. 8-22.

Takeuchi et al., "SXnet: a practical approach to digital video networking—a migration path to digital video distribution as applied to the broadcast news operation", Society of Motion Picture & Television Engineering (SMPTE) Journal, vol. 108, No. 3, Mar. 1999, pp. 168-172.

Beeson et al., "Chaper 3. Skin in the "Dawn" Demo", GPU Gems, Nvidia Corporation, 5th printing Sep. 2007, pp. 47-48.

* cited by examiner

METHOD FOR GENERATING AN ENVIRONMENT MAP

This application claims the benefit, under 35 U.S.C. §365 of International Application PCT/EP2010/070247, filed Dec. 20, 2010, which was published in accordance with PCT Article 21(2) on Jul. 7, 2011 in English and which claims the benefit of European patent application No. 09306301.4 filed Dec. 21, 2009.

1. SCOPE OF THE INVENTION

The invention relates to the domain of synthesis images compositing and more specifically to the domain of real time generation of an environment map for a virtual environment or tridimensional (3D) scene.

2. PRIOR ART

According to the state of the art, methods for realistic rendering make extensive use of image-based lighting, in which a real lighting environment is captured and reused to light virtual objects. However, the capture of such lighting environments usually requires still scenes and specific capture hardware such as high end digital cameras, mirror balls or HDR video capture devices.

With the emergence of interactive games and simulation applications, there is an increasing need of methods enhancing the impression of immersion in and interactivity with virtual environment, notably in real time.

3. SUMMARY OF THE INVENTION

The purpose of the invention is to overcome these disadvantages of the prior art.

More particularly, a particular purpose of the invention is to enhance the impression of immersion into a virtual environment.

The invention relates to a method for generating an environment map representative of a real environment, comprising the steps of:
  acquisition at real time of an image representative of a partial lighting information of the real environment from a digital optical acquisition device, the image comprising a plurality of pixels,
  estimation of the environment map by extrapolation of at least a part of the pixels of the image.

Advantageously, the method comprises a step of diffuse filtering of the environment map.

According to a particular characteristic, the method comprises a step of glossy filtering of the environment map.

In an advantageous manner, the extrapolation comprises a step of span of the value of pixels belonging to the border of the image to the whole environment map.

According to another characteristic, the extrapolation comprises the application of a value corresponding to the mean value of the pixels of the image to at least a part of the environment map.

Advantageously, the application of the value is weighted with a weighting factor depending on the at least a part of the environment map.

According to another characteristic, the acquisition device has a focal length greater than a threshold value.

In an advantageous manner, the environment map is represented by an angular map.

4. LIST OF FIGURES

The invention will be better understood, and other specific features and advantages will emerge upon reading the following description, the description making reference to the annexed drawings wherein.

5. DETAILED DESCRIPTION OF EMBODIMENTS OF THE INVENTION

Invention will be described by reference to a particular embodiment of a method for generating an environment map representative of a real environment, the environment map comprising information being used for lighting a virtual environment. This method provides a simple and inexpensive solution for extracting lighting information out of the images provided by a simple webcam or other acquisition devices. The captured image is first remapped onto an environment map and the captured lighting information issued from the captured image is extrapolated in unknown parts of the surrounding environment. According to an advantageous variant, the extrapolated lighting information representation is then filtered in real-time using graphics hardware for high quality rendering. While approximate, the invention provides plausible environment maps usable for virtual reality and multimedia applications, and runs in real-time even on low-end graphics hardware.

Figure 1:
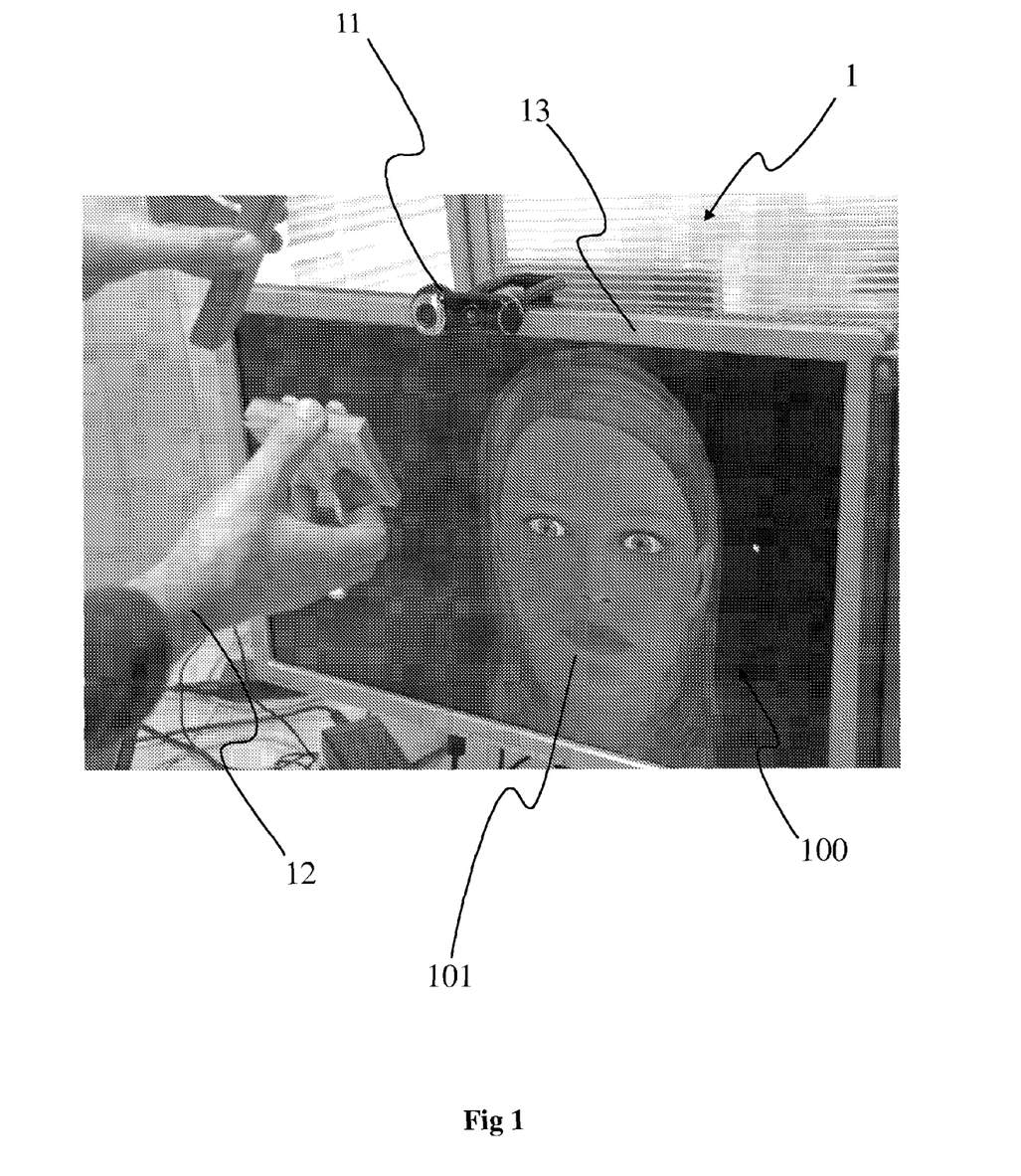
FIG. 1 illustrates a virtual environment receiving lighting information from a real environment, according to a particular embodiment of the invention, FIG. 2 diagrammatically illustrates the capture of an image representative of a partial lighting information of the real environment of FIG. 1, according to a particular embodiment of the invention, FIG. 3 diagrammatically illustrates a method for extrapolating the captured lighting information of FIG. 2, according to a particular embodiment of the invention, FIG. 4 diagrammatically illustrates an environment map generated by extrapolating the captured lighting information of FIG. 2, according to a particular embodiment of the invention.
Figure 5:
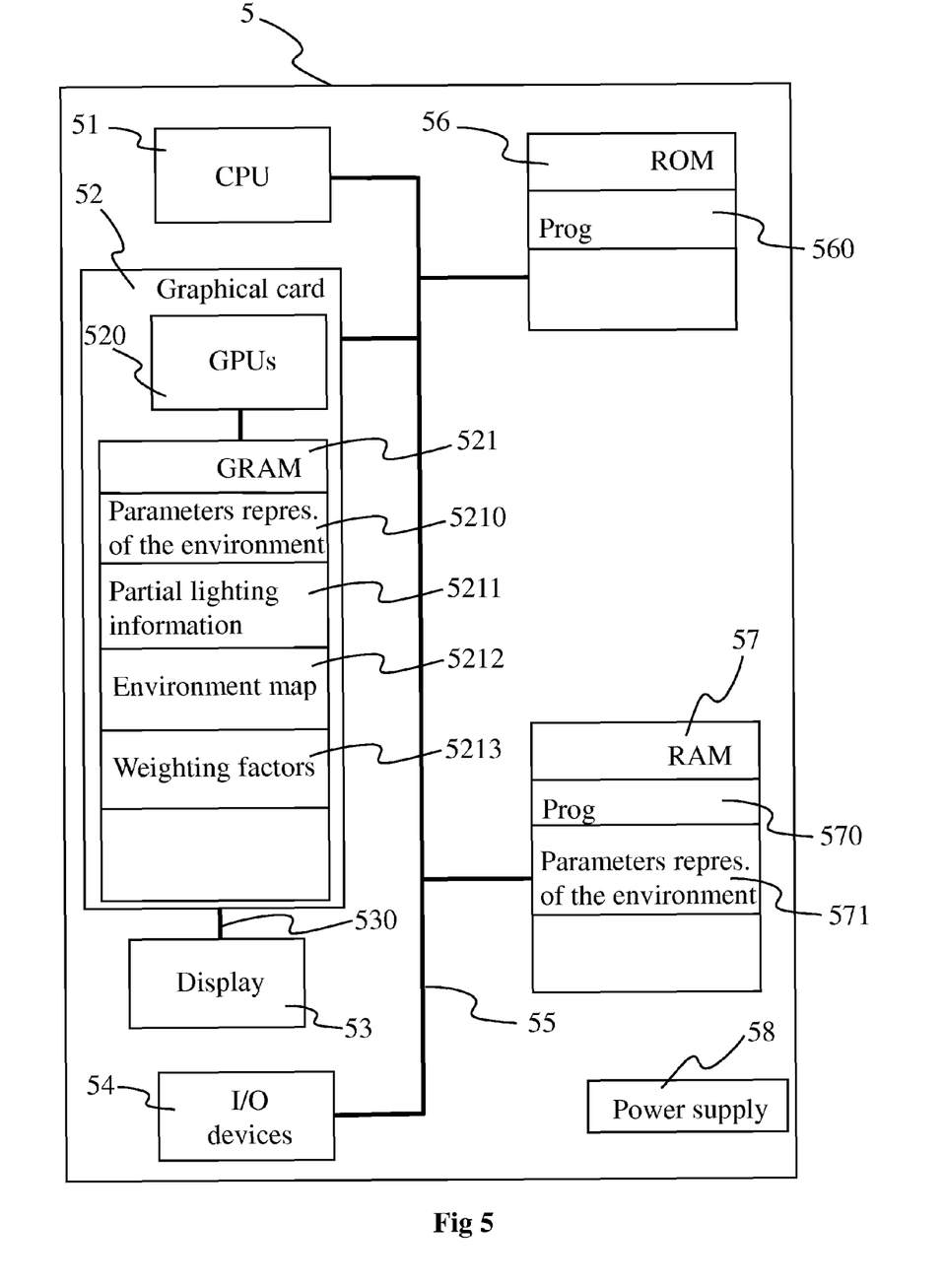
FIG. 5 illustrates a device implementing a method for generating the environment map of FIG. 4, according to a particular embodiment of the invention.

FIG. 1 illustrates a user 12 belonging to a real environment 1 interacting with a virtual environment (also called 3D scene) 100 displayed on a screen 13. The virtual environment 100 comprises a virtual object (also called 3D object) 101, for example an avatar with whom the user 12 interacts. The avatar is for example a graphical representation of a person with whom the user 12 speaks via a video-chat application or a graphical representation of character of a virtual application (for example a game) controlled by the user 12. As to increase the impression of immersion into the virtual environment for the user 12, information representative of the lighting of the real environment 1 is captured by a digital optical acquisition device 11, for example a webcam. As the limited aperture of the acquisition device 11 does not allow the capture of the entire environment, the captured incoming lighting is extrapolated outside the range of the acquisition device 11, yielding a full estimate of the incoming lighting for any direction in space. The use of lighting information coming from the real environment 1 for lighting the virtual environment 100 increases the impression that the real environment 1 and the virtual environment 100 merge into one environment. It thus increases the impression for a user 12 to immerse into the virtual environment 100 with which he interacts. For real-time virtual reality applications, the location of choice for the optical acquisition device 11 is then directly above or under the display screen 13 to ensure the spatial coherence of the lighting. According to a variant, in the context of lighting design for example, the acquisition device 11 is placed in any desired location to obtain the target lighting.

Figure 2:
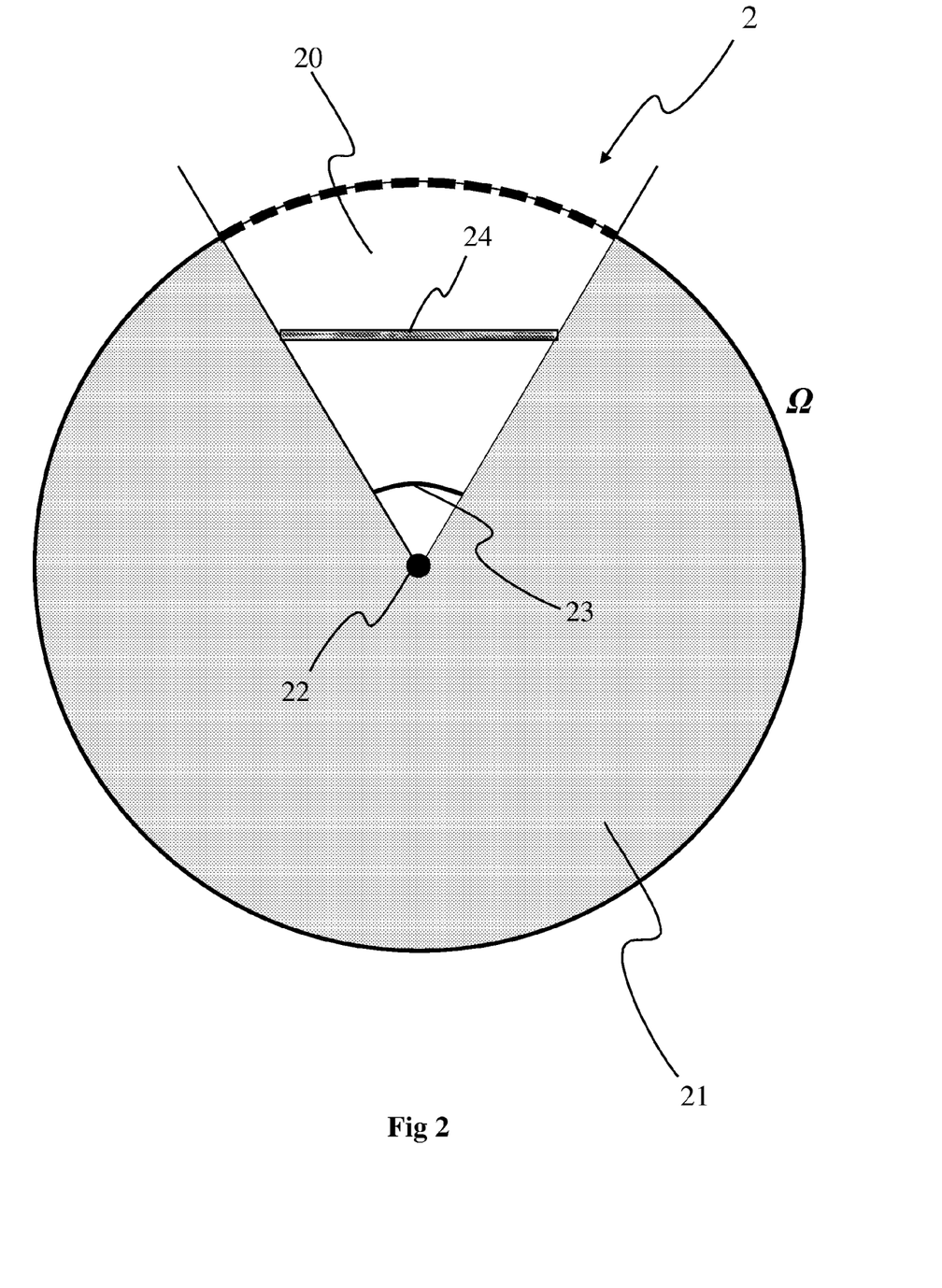

FIG. 2 diagrammatically illustrates the capture of an image 24 representative of partial lighting information of the real environment 1 by a digital optical acquisition device 22. By mapping the captured image 24 (or the lighting information/data which results) on a virtual sphere Ω (the optical acquisition device being located at the centre of the sphere), an environment map 2 of the real environment 1 is obtained. The lighting information resulting from the capture of the real environment is limited to the aperture 23 of the acquisition device 22. The environment map 2 is thus composed of two parts, the first one 20 being the available lighting information and the second one 21 being the missing lighting information which has to be reconstructed. The aperture 23 of the acquisition device 22 depends on the focal length of the acquisition device. In an advantageous way, the acquisition device 22 is a webcam which has the advantages of being inexpensive and available on many of current display screens, computer devices (such as laptops) or even smart-phones. The focal length of a webcam is for example greater than a threshold value which is equal for example to 25 mm or 50 mm. According to a variant, the optical acquisition device is a high-resolution device, or an HDR ("High Dynamic Range") device having a focal length less or greater than the aforementioned threshold value.

Figure 3:
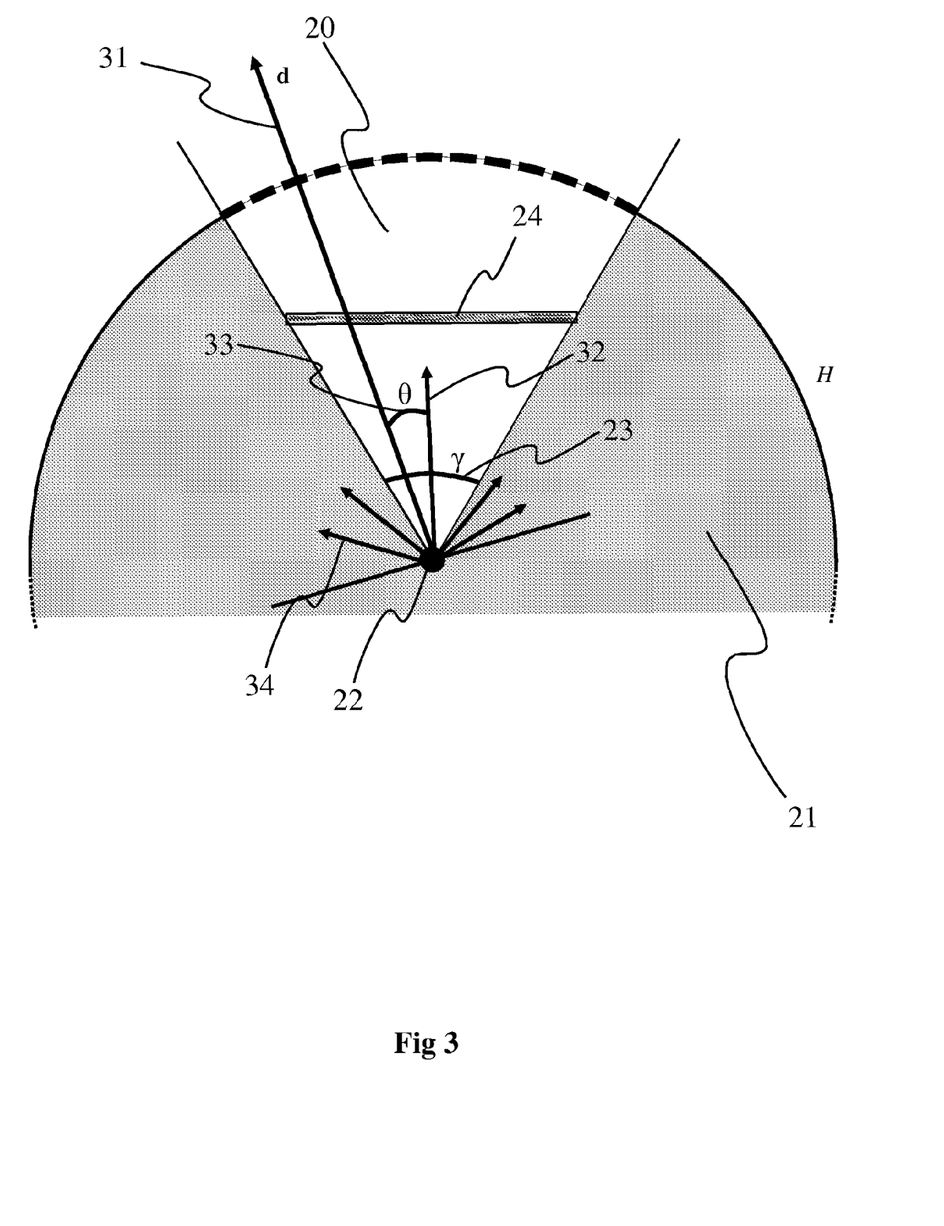

FIG. 3 diagrammatically illustrates a method for extrapolating the captured lighting information, according to a particular and non-limitative embodiment of the invention.

As to reconstruct the entire environment lighting from the captured lighting information, the acquired data are mapped onto a virtual sphere as shown in FIG. 2, yielding an angular map of the environment map. An angular map is an angular representation of the environment map. A direction d 31 corresponds to a pixel (x, y)=($d_x$r, $d_y$r) in the target angular map, where:

$$r = \frac{1}{\pi} \frac{\arccos d_z}{\sqrt{d_x^2 + d_y^2}}$$ Equation 1

Likewise, one can associate a pixel (x, y) of the captured data to a direction $d_{capture}$:

$$d_{capture_x} = \tan\frac{\gamma_x}{2}\left(\frac{2x}{Res_x} - 1\right)$$

$$d_{capture_y} = \tan\frac{\gamma_y}{2}\left(\frac{2y}{Res_y} - 1\right)$$

$$d_{capture_z} = 1$$

Equations 2

Figure 4:
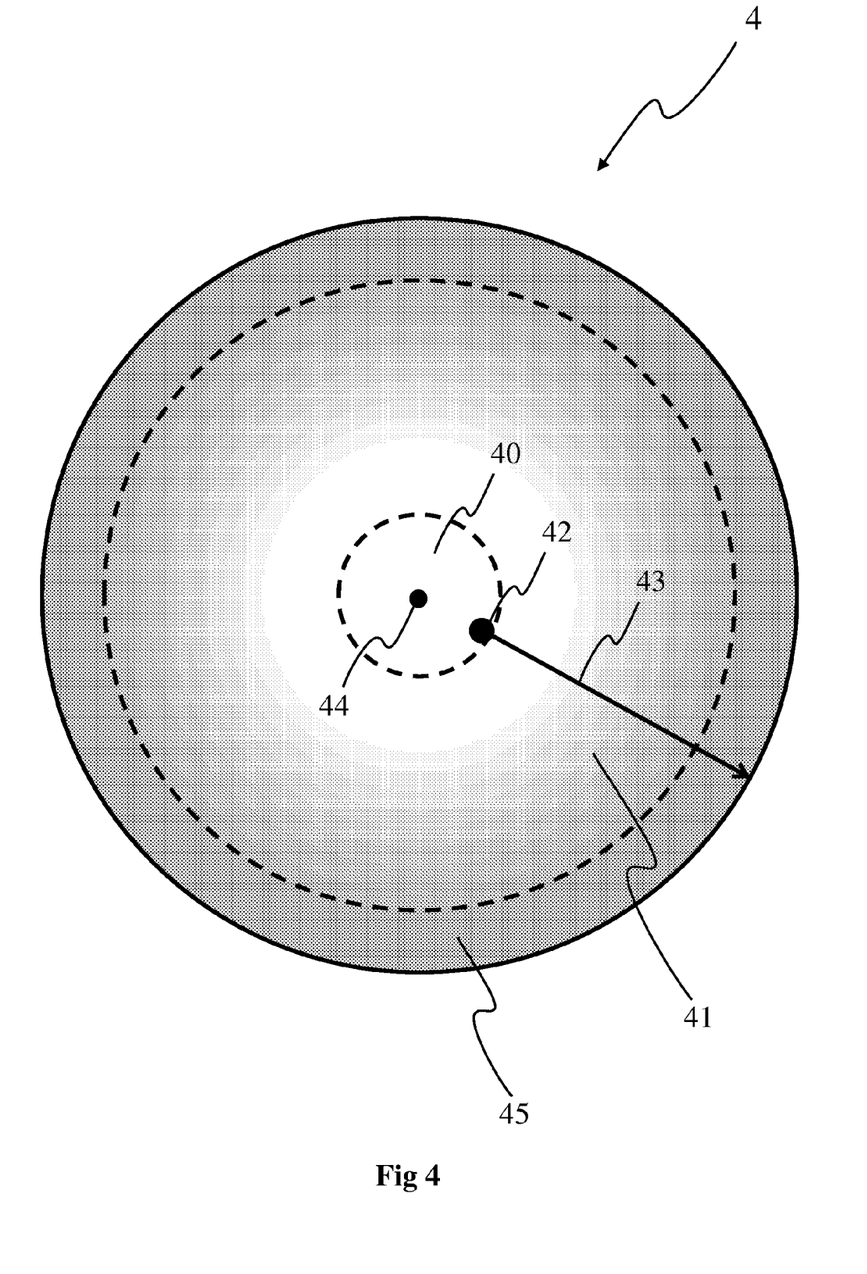

Where
$\gamma_x$ and $\gamma_y$ are the respective horizontal and vertical apertures of the acquisition device
$Res_x$ and $Res_y$ are the respective horizontal and vertical resolutions of the captured image Using this correspondence, the captured image 24 is then mapped onto an angular map 4 (which correspond to an angular representation of the environment map) illustrated on FIG. 4, yielding a partial representation of the environment map. As the available information on the incoming lighting is partial due to the limited aperture of the webcam, many sample directions d 34 may correspond to unknown parts of the environment. The missing lighting information is then extrapolated to complete the environment map. The incoming lighting is extrapolated by extension of border pixels 42 of the captured image over the rest of the sphere: each border pixel 42 spans a very large solid angle in the environment map. In other words, the pixel value of a border pixel 42 of the captured image 24 is reproduced for every pixel along a direction 43 starting from the considered border pixel 42 and following the curvature of the sphere Ω, as illustrated on FIG. 4. Then, every extrapolated pixel along a given direction 43 takes the same pixel value as the pixel value of the border pixel 42.

According to a variant, every extrapolated pixel takes a pixel value corresponding to a user-defined value for the missing parts 21 of the environment map.

According to another variant, the average value of the captured incoming lighting 20 is used on the unknown parts 21 of the sphere. The environment map generation is then divided into two parts: first, the partial environment map is generated as detailed before. At the same time, the percentage of sample directions around a given direction d 31 corresponding to unknown lighting values is determined. Such samples yield a zero contribution to the lighting incoming in the target direction. To that aim, a set 34 of N random directions 32 is selected according to a cosine distribution 33 around d 31. The ratio between the random directions located in the part 21 of the sphere for which no light information is available and N provides a value α. The output of the partial environment map generation is then an RGB α texture, where the RGB channels contain the convolved lighting values and the alpha channel stores the amount of directions corresponding to unknown values. A good notion of the average lighting is provided by the center pixel 44 of the partial environment map: the directions used during the convolution are mostly located within the range of the acquisition device 22. Therefore, the pixels of the final environment map are obtained through a weighted sum of the partial environment map $L_{part}$ and this average value $L_{avg}$. The weight value is the alpha channel of the partial map, the amount of directions corresponding to unknown lighting values. The extrapolated lighting is then defined by:

$$L_{final}(d) = \alpha \cdot L_{avg} + (1-\alpha) \cdot L_{part}$$

The result of such an extrapolation is illustrated on FIG. 4. FIG. 4 illustrates an angular map 4 representative of lighting information of the real environment, according to a particular and non-limitative embodiment of the invention. The angular map 4 corresponds to an angular representation of the environment map of the real environment. For obtaining the angular map 4, pixels of the sphere Ω (corresponding to the environment map) are projected in a plane, which is orthogonal to the main capture direction of the acquisition device 22. The angular map is centered on an area 40 comprising mostly the pixels of the captured partial light information 20, i.e. the pixels of the captured image 24, i.e. the light information from the real environment captured with the acquisition device 22. This area is delimited with a circular dotted line. The angular map 4 is illustrated with a grey gradation 41, the lightest part 41 of the gradation being located at the center of the angular map and the darkest part 45 being located at the periphery of the angular map. Indeed, the lightest part 41 corresponds to a part comprising a lot of pixels for which the value has been captured from the optical acquisition device (corresponding to the partial light information 20). The darkest part 45, delimited by a circular dotted line, corresponds to a part comprising pixels for which the pixel value has been estimated by extrapolation and for which the value α is high, i.e. near from 1. For pixels of that part 45, the uncertainty on their pixel value is high as they belongs to missing parts 21 of the environment map which are far away from the part 20 for which light information has been captured and is thus available. In a general way, the further one is away from the center part of the angular map, the more the number of pixels for which the value α is high is important.

After extrapolation of the pixel value of pixels belonging to missing parts 21 of the sphere Ω, diffuse and/or glossy filtering of the angular map is advantageously performed. For each pixel P of the virtual sphere Ω illustrated on FIG. 2, the corresponding direction d is determined. Then, for diffuse surfaces, a set 34 of random directions of the sphere is determined according to a cosine distribution around d. Using Monte Carlo integration, the equation describing the integration of the incoming lighting on a hemisphere H around d becomes:

$$L_{diffuse}(d) \approx \pi \sum_{1}^{N} \frac{L(\omega_i)}{\cos\theta_i} \qquad \text{Equation 3}$$

Where $L_{diffuse}(d)$ is the amount of light diffused along direction d $L(\omega_i)$ corresponds to the amount of light diffused along a direction $\omega_i$ belonging to the set of N directions 34

$\Theta_i$ corresponds to the angle formed by the direction d and the direction $\omega_i$ The Monte Carlo integration provides an approximate solution to the integral equation, the precision of which being directly related to the number of samples N in equation 3. In the context of real-time computation, the numerical integration is advantageously carried out in a very small amount of time. If this integration is performed on a high resolution image, only a very small number of samples (for example 5, 10 or 20) are afforded per environment direction even on the latest graphics hardware. Using such a small number of samples yields very noisy results both in space and time, and hence light speckles and flickering in the final image. However, the diffuse or moderately glossy lighting tends to vary smoothly over directions. This observation can be leveraged to reduce the resolution of the generated filtered environment map to very small values, such as 128×128. In this case, the sampling quality of each pixel of the filtered environment map can be higher (typically 50 samples/pixel) while still meeting the real-time constraints.

FIG. 5 diagrammatically illustrates a hardware embodiment of a device 5 adapted for the generation of an environment map 4 representative of lighting information of a real environment 1 and adapted to the creation of display signals of one or several images. The device 5 corresponds for example to a personal computer PC, to a laptop, to a game console or to a work station.

The device 5 comprises the following elements, connected to each other by an address and data bus 24, which also transports a clock signal:

a microprocessor 51 (or CPU),
a graphical card 52 comprising:
 several graphic processor units GPUs 520
 a volatile memory of the GRAM ("Graphical Random Access Memory") type 521,
a non-volatile memory of the ROM ("Read Only Memory") type 56,
a Random Access Memory (RAM) 57,
one or several I/O ("Input/Output") devices 54, such as for example a keyboard, a mouse, a webcam, and so on,
a power supply 58.

The device 5 also comprises a display device 53 of the type of display screen directly connected to the graphical card 52 for notably displaying the rendering of synthesis images lighted by an environment map which are computed and composed in the graphical card, for example in real time. The use of a dedicated bus for connecting the display device 53 to the graphical card 52 has the advantage of having more important throughput of data transmission, thus reducing latency time for displaying images composed by the graphical card. According to a variant, a display device is outside the device 5 and is connected to the device 5 with a cable transmitting display signals. The device 5, for example the graphical card 52, comprises transmission means or a connector (non illustrated on FIG. 5) adapted for the transmission of display signals to external display means such as for example a LCD or plasma screen, a video projector.

It is noted that the word "register" used in the description of the memories 52, 56 and 57 designates, in each of the memories mentioned, a memory zone of low capacity (some binary data) as well as a memory zone of large capacity (enabling a whole program to be stored or all or part of the data representative of computed data or data to be displayed).

When powered up, microprocessor 51 loads and runs the instructions of the program stored in RAM 57.

The random access memory 57 notably comprises:
in a register 530, the operating program of the microprocessor 51 loaded at power up of the device 5,
parameters 531 representative of the virtual environment (for example, parameters for modeling objects of the virtual environment, parameters for lighting the virtual environment),
the reception parameters 232 (for example, modulation, coding, MIMO, frame recurrence parameters), The algorithms implementing the steps of the method specific to the invention and described below are stored in the GRAM 57 of the graphical card 52 associated with the device 5 implementing these steps. When powering up and once the parameters 571 representative of the virtual environment loaded in RAM 57, the GPUs 520 of the graphical card 52 load these parameters in GRAM 521 and executes the instructions of these algorithms under the form of micro-programs such as "shader" using the HLSL ("High Level Shader Language") language, the GLSL ("OpenGL Shading language") language for example.

The GRAM 521 notably comprises:
in a register 5210, the parameters representative of the virtual environment 100,
partial lighting information 5211,
data representative of an environment map 5212 representative of the environment map of the real environment 1, and
values 5213 representative of the ratio α.

According to a variant, a part of the RAM 57 is allocated by the CPU 51 for storing the data 5211, 5212 and 5213 if memory space available in GRAM 521 is not sufficient. Nevertheless, this variant brings more important latency time in the composition of the environment map and of an image comprising a representation of the virtual environment 100 composed form the micro-programs comprised in the GPUs as the data have to be transmitted from the graphical card to the RAM 57 through the bus 35 that has transmission capacities generally less than capacities available in the graphical card for transmitting the data from the GPUs to the GRAM and inversely.

According to a variant, the power supply 58 is outside the device 5.

Figure 6:
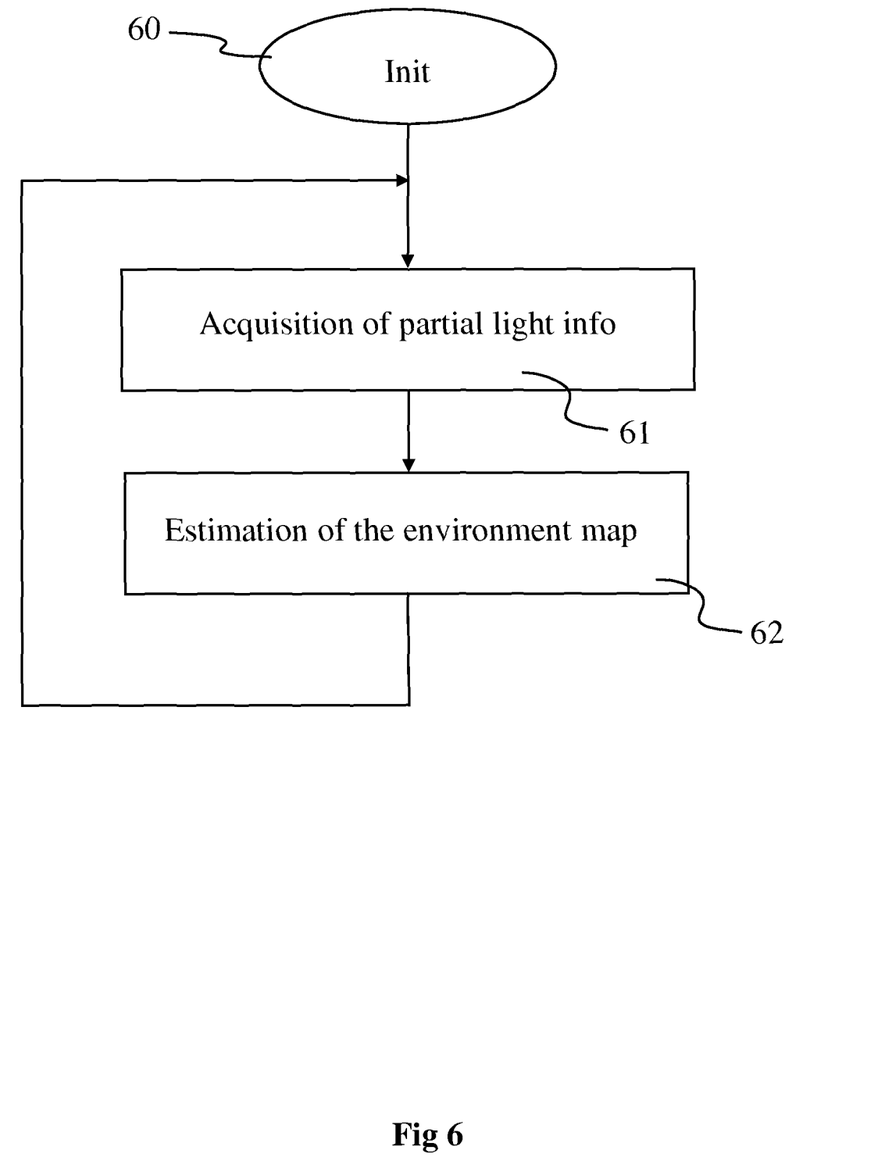
FIG. 6 illustrates a method for generating an environment map of a real environment of FIG. 1, according to a particular embodiment of the invention.

FIG. 6 illustrates a method for generating an environment map representative of lighting information of a real environment 1, according to a particular and non limitative embodiment of the invention.

During an initialization step 60, the various parameters of the device 5 are updated. In particular, the parameters representative of the virtual environment including the parameters of the environment map are initialized in any manner.

Next, during a step 61, an image is captured with a digital optical acquisition device, the image being representative of partial lighting information of a real environment. The partial lighting information captured by the acquisition device corresponds to the part of the real environment which can be captured by the acquisition device according to its aperture angle, i.e. according to its focal length. The acquisition of the image, which comprises a plurality of pixels, is advantageously performed in real time, lighting variation over the time being thus captured. The digital optical acquisition device corresponds for example to a webcam having a focal length greater than a threshold value, the threshold value being for example equal to 25 or 50 mm. According to a variant, the digital optical acquisition device is a high resolution camera or a HDR camera. According to another variant, the focal length of the acquisition device is less than the threshold value, the captured partial light information being more important according to that variant than if the focal length is greater than the threshold value.

Then, during a step 62, an environment map representative of the lighting information of the real environment is estimated by extrapolating the captured partial light information. The extrapolation enables to fill the parts of the environment map having no information about light information of the real environment as being out of the range of capture of the acquisition device. Advantageously, the extrapolation of the partial light information comprises the spanning of the pixel value of the border pixels of the captured image to the rest of the environment map. Thus, the pixel value of each of the pixel belonging to the periphery of the captured image is associated to the pixels of the environment map (or of an angular map, which is an angular representation of the environment map and thus corresponds to the environment map) located along a curve beginning at the border pixel and following the bend of the environment map (which is represented with a sphere $\Omega$). According to a variant, the extrapolation comprises the application of the mean value of the pixels of the captured image to one or several areas of the environment map. According to this variant, the area(s) on which is applied the mean value correspond to the parts of the environment map for which no information about the lighting of the real environment has been captured, for example the part of the environment map which is the opposite of the part corresponding to the captured image. This variant offers the advantage of correcting possibly important over- or under-estimations of the surrounding lighting due to the spanning of the border pixels to the other pixels of the environment map. According to another variant, the application of the mean value to some parts of the environment map is weighted with a weighting factor. The weighting factor corresponds advantageously to the ratio $\alpha$, which corresponds to the percentage of sample directions around a given direction d corresponding to unknown lighting values, as described with regard to FIG. 3. The weighting factor $\alpha$ thus depends on the location of the pixels of the environment map for which the pixel value is extrapolated. According to another variant, the extrapolation comprises the application of a user-defined value to the pixels of the environment map for which no lighting information coming from the real environment is available.

In an advantageous way, the environment map is represented under the form of an angular map, which is an angular representation of the environment map. An angular representation has the advantage of representing the whole environment map in one single compact map. According to a variant, the environment map is represented with any other type of representation, for example latitude-longitude representation, dual-paraboloid representation, cube map representation, mirror ball representation.

According to a variant, the method comprises a step of diffuse filtering of the environment map, this step being performed before or after step 62, the diffuse filtering being advantageously performed in real-time. This variant offers the advantage of enabling a quick computation of the lighting on diffuse surfaces and of not being limited to perfect mirror surface.

According to another variant, the method comprises a step of glossy filtering of the environment map, this step being performed before or after step 62, the glossy filtering being advantageously performed in real-time. This variant offers the advantage of enabling a quick computation of the lighting on moderately specular surfaces and of not being limited to perfect mirror surface.

Naturally, the invention is not limited to the aforementioned embodiments.

In particular, the invention is not limited to a method for generating an environment map representative of lighting information but also extends to any device implementing this method and notably all devices comprising at least a GPU. Implementation of the calculations needed for generating the environment map is not limited to an implementation in micro-programs of the shader type but also extends to an implementation in every type of program, for example some programs to be executed by a microprocessor of CPU type.

Use of the invention is not limited to real time use but also extends to any other use.

Invention can advantageously be used in virtual conferencing. Each user is represented by an avatar in the virtual world. As the invention provides plausible, dynamic lighting reconstruction, the gap between the real user and the virtual avatar tends to be reduced, thus enhancing the presence of the avatar. A wide range of other applications can benefit from the invention, such as virtual training or collaborative virtual worlds.

The invention provides simple acquisition of surrounding lighting. As it allows the user to directly interact with the lighting of the virtual environment, the invention can advantageously be used as a basis for an interactive light editing tool. Starting with a 3D model, the user can use real light sources to build a prototype of the virtual lighting environment. As the invention provides a full description of the environment lighting, the reconstructed environment map can be used as is to light virtual environments in production. Another possibility relies on the combination of several environment maps to build the target lighting: the lighting is captured several times, then combined to obtain the desired effect. Also, the user could use the invention to generate an environment map and then perform automatic extraction of semi-interactive point light source corresponding to the major lighting elements of the map.

As the aperture of a webcam is typically small, most of the spherical information is obtained through extrapolation. A simple way for reducing this problem without introducing prohibitive artifacts consists in artificially widening the aperture of the webcam. Thus the image spans a larger part of the sphere, reducing the amount of extrapolated data. While physically incorrect, this solution emphasizes the movement of real objects around the camera, hence enhancing the sensation of immersion of the virtual object into the real world. For lighting design, this provides a simple and intuitive way of creating light sources for any direction of the hemisphere instead of being limited to the actual webcam aperture range.

According to a variant, the dynamic range of the captured lighting is increased by dynamically modifying the exposure time of the acquisition device sensor as to emulate the capture of HDR images.

Invention also relates to a method for composing a video image, in two or three dimensions, for which the environment map is generated from the capture of the lighting of a real environment.

In an advantageous way, the device 5 illustrated on FIG. 5 is provided with interaction means such as a keyboard and/or joysticks, other input means such as for example voice recognition being also possible.

The invention claimed is:

1. A method of generating an environment map representative of lighting information of a real environment, comprising:
    acquiring in real time an image representative of a partial lighting information corresponding to a partial representation of said real environment from an image acquisition device, said image comprising a plurality of pixels,
    generating said environment map by:
        applying said partial lighting information to a first part of the environment map;
        applying values of pixels of a border of said image to at least a second part of the environment map, the second part being different from the first part; and
        applying a value corresponding to a mean value of at least a part of the pixels of said image to a third part of the environment map, said third part being different from the first part and the second part.

2. The method according to claim 1, further comprising diffuse filtering of said environment map.

3. The method according to claim 1, further comprising glossy filtering of said environment map.

4. The method according to claim 1, wherein the application of said value corresponding to the mean value is weighted with a weighting factor depending on said third part of the environment map.

5. The method according to claim 1, wherein said acquisition device has a focal length greater than a threshold value.

6. The method according to claim 1, wherein said environment map is represented by an angular map.

7. A device for generating an environment map representative of lighting information of a real environment, comprising:
    a camera acquiring in real time an image representative of a partial lighting information corresponding to a partial representation of said real environment, said image comprising a plurality of pixels,
    a processor configured to generate said environment map by:
        applying said partial lighting information to a first part of the environment map;
        applying values of pixels of a border of said image to at least a second part of the environment map, the second part being different from the first part; and
        applying a value corresponding to a mean value of at least a part of the pixels of said image to a third part of the environment map, said third part being different from the first part and the second part.

8. The device according to claim 7, wherein the application of said value corresponding to the mean value is weighted with a weighting factor depending on said third part of the environment map.

9. The device according to claim 7, wherein said processor is configured to diffuse filter said environment map.

10. The device according to claim 7, wherein said processor is configured to glossy filter said environment map.

11. The device according to claim 7, wherein said camera has a focal length greater than a threshold value.

12. The device according to claim 7, wherein said processor is configured to represent said environment map by an angular map.

13. A non-transitory computer-readable medium comprising a computer program product recorded thereon and capable of being run by a processor, including program code instructions for implementing the method according to claim 1.

* * * * *